(12) United States Patent
Ruhland et al.

(10) Patent No.: US 11,311,891 B2
(45) Date of Patent: Apr. 26, 2022

(54) MULTI-CYCLONE SEPARATOR OF A MULTI-STAGE FLUID FILTER FOR CLEANING GASEOUS FLUID AND MULTI-STAGE FLUID FILTER

(71) Applicant: MANN+HUMMEL GmbH, Ludwigsburg (DE)

(72) Inventors: Klaus-Dieter Ruhland, Meckenheim (DE); Michael Kaufmann, Meckenheim (DE); Juergen Schmitt, Hanhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 321 days.

(21) Appl. No.: 16/593,817

(22) Filed: Oct. 4, 2019

(65) Prior Publication Data

US 2020/0030821 A1    Jan. 30, 2020

Related U.S. Application Data (63) Continuation of application No. PCT/EP2018/058826, filed on Apr. 6, 2018.

(Continued)

(30) Foreign Application Priority Data

Aug. 4, 2017    (DE) ...................... 10 2017 007 326.0

(51) Int. Cl.
*B01D 46/00*      (2022.01)
*B01D 45/16*      (2006.01)
(Continued)

(52) U.S. Cl.
CPC ................ *B04C 3/04* (2013.01); *B01D 45/16* (2013.01); *B01D 46/0012* (2013.01);
(Continued)

(58) Field of Classification Search
CPC .. B01D 45/16; B01D 46/0012; B01D 50/002; B04C 3/04; B04C 3/06; B04C 9/00;
(Continued)

(56) References Cited

U.S. PATENT DOCUMENTS 2,662,610 A    12/1953   Heinrich
4,407,663 A *   10/1983   Hawley .................. B01D 45/12
                                                         312/111
(Continued)

FOREIGN PATENT DOCUMENTS

EP        2555848 A1    10/2011
EP        2719463 A1    4/2014
(Continued)

*Primary Examiner* — Minh Chau T Pham (57) ABSTRACT

A multi-cyclone separator of a multi-stage fluid filter for cleaning gaseous fluid is provided with a plurality of cyclone cells for separating particles and/or liquid from the gaseous fluid. The cyclone cells each have an inlet for the gaseous fluid to be purified, an outlet for the gaseous fluid freed of particles and liquid, and at least one discharge window discharging the separated particles and liquid. At least one discharge chamber is provided, and the discharge windows of the cyclone cells open into the at least one discharge chamber. At least one discharge opening leads out of the at least one discharge chamber. The at least one discharge (Continued)

chamber tapers in a funnel shape toward the at least one discharge opening. A multi-stage fluid filter is provided with the multi-cyclone separator that is arranged upstream of a main filter of the multi-stage fluid filter.

13 Claims, 4 Drawing Sheets

Related U.S. Application Data (60) Provisional application No. 62/482,536, filed on Apr. 6, 2017.

(51) Int. Cl.
| | | |
|---|---|---|
| *B01D 50/20* | (2022.01) | |
| *B04C 3/04* | (2006.01) | |
| *B04C 3/06* | (2006.01) | |
| *B04C 9/00* | (2006.01) | |
| *F02M 35/02* | (2006.01) | |
| *F02M 35/022* | (2006.01) | |

(52) U.S. Cl.
CPC ............... *B01D 50/20* (2022.01); *B04C 3/06* (2013.01); *B04C 9/00* (2013.01); *B04C 2009/002* (2013.01); *F02M 35/0215* (2013.01)

(58) Field of Classification Search
CPC .......... B04C 2009/002; F02M 35/0215; F02M 35/0202; F02M 35/0223
USPC ...... 55/385.3, 348, 345, 337, 447, 456, 457, 55/504, 498; 123/198 E
See application file for complete search history.

(56) References Cited

U.S. PATENT DOCUMENTS

| | | | | |
|---|---|---|---|---|
| 5,403,367 | A  * | 4/1995 | De Villiers | B01D 50/002 55/320 |
| 6,572,667 | B1 * | 6/2003 | Greif | B01D 46/0024 55/323 |
| 8,657,903 | B2 * | 2/2014 | Menssen | B01D 50/002 55/345 |
| 2007/0289265 | A1* | 12/2007 | Coulonvaux | B01D 46/0023 55/324 |
| 2010/0267540 | A1* | 10/2010 | Babb | B01D 45/16 494/59 |
| 2012/0198802 | A1* | 8/2012 | Menssen | B01D 46/2414 55/337 |
| 2013/0031878 | A1* | 2/2013 | Menssen | F02M 35/0223 55/345 |
| 2014/0102054 | A1* | 4/2014 | Wuebbeling | F02M 35/0223 55/348 |
| 2014/0298761 | A1* | 10/2014 | Ackermann | B01D 45/16 55/457 |
| 2014/0360144 | A1* | 12/2014 | Coulonvaux | B01D 46/0005 55/357 |
| 2014/0373490 | A1* | 12/2014 | Wuebbeling | B01D 45/08 55/345 |
| 2017/0096971 | A1* | 4/2017 | Kaufmann | B01D 45/16 |

FOREIGN PATENT DOCUMENTS

| | | |
|---|---|---|
| FR | 1291868 A | 4/1962 |
| WO | 2016113001 A1 | 7/2016 |
| WO | 2016124257 A1 | 8/2016 |

* cited by examiner

MULTI-CYCLONE SEPARATOR OF A MULTI-STAGE FLUID FILTER FOR CLEANING GASEOUS FLUID AND MULTI-STAGE FLUID FILTER

CROSS-REFERENCE TO RELATED APPLICATIONS

This application is a continuation application of international application No. PCT/EP2018/058826 having an international filing date of 6 Apr. 2018 and designating the United States, the international application claiming a priority date of 6 Apr. 2017 based on prior filed U.S. provisional application Ser. No. 62/482,536 and a priority date of 4 Aug. 2017 based on prior filed German application for patent No. 10 2017 007 326.0, the entire contents of the aforesaid international application and the aforesaid German patent application being incorporated herein by reference.

BACKGROUND OF THE INVENTION

The invention concerns a multi-cyclone separator of a multi-stage fluid filter for cleaning gaseous fluid,
  with a plurality of cyclone cells for separating particles and/or liquid from the gaseous fluid, wherein the cyclone cells each have an inlet for the gaseous fluid to be purified, an outlet for the gaseous fluid freed of particles and liquid, and at least one discharge window for discharging separated particles and liquid,
  with at least one discharge chamber for separated particles and liquid into which the discharge windows of the cyclone cells open,
  and with at least one discharge opening which leads out of the at least one discharge chamber.
Moreover, the invention concerns a multi-stage fluid filter for purifying gaseous fluid, with at least one multi-cyclone separator which is arranged upstream of at least one main filter for purifying the gaseous fluid, wherein the multi-cyclone separator comprises
  a plurality of cyclone cells for separating particles and/or liquid from the gaseous fluid, wherein the cyclone cells each have an inlet for the gaseous fluid to be purified, an outlet for the gaseous fluid freed of particles and liquid, and at least one discharge window for discharging separated particles and liquid,
  at least one discharge chamber for separated particles and liquid into which the discharge windows of the cyclone cells open,
  and at least one discharge opening which leads out of the at least one discharge chamber.

WO 2016/113001 A1 discloses a pre-separator module which is embodied as a cyclone block. In the cyclone block, a plurality of individual cyclone cells in a so-called multi-cyclone block are parallel connected in regard to flow. Dust or water that has been preseparated in the cyclone block is removed through a dust discharge socket from a pre-separator housing.

It is an object of the invention to configure a multi-cyclone separator and a multi-stage fluid filter of the aforementioned kind in which a separation efficiency can be improved and/or a service life of the multi-cyclone separator can be extended.

SUMMARY OF THE INVENTION

The technical object is solved according to the invention for the multi-cyclone separator in that the at least one discharge chamber tapers like a funnel toward the at least one discharge opening.

Due to the funnel-type tapering (funnel shape) of the at least one discharge chamber, the separated particles, in particular dust, and/or liquid, in particular water or water droplets, can be guided toward the at least one discharge opening. In this way, a discharge efficiency can be improved.

Moreover, in this way, an additional suction action for the separated particles and/or the liquid can be dispensed with so that the total expenditure, in particular the component expenditure and/or mounting expenditure, of the multi-cyclone separator can be reduced. By dispensing with an additional suction action, an expenditure for corresponding tube connections for connecting to at least one discharge opening can be reduced. A discharge of the separated particles and/or of the liquid by forgoing an additional suction action can be referred to as "self discharge". In this way, the multi-cyclone separator can be referred to as "self-discharging multi-cyclone separator".

The separated particles and the separated liquid can be discharged faster by means of the funnel-type tapering (funnel shape), with or without suction action, from the at least one discharge chamber. In this way, as a whole greater quantities of separated particles and/or separated liquid can be conveyed out of the multi-cyclone separator. In this way, a correspondingly high flow rate of gaseous fluid can be enabled even in operation of the multi-stage fluid filter in a greatly dust-laden and/or liquid-laden environment.

Advantageously, the multi-cyclone separator can be used in connection with a two-stage compact fluid filter. The two-stage compact fluid filter can comprise the multi-cyclone separator as a first stage and a main filter as a second stage. An outlet side of the multi-cyclone separator can be connected with an inlet side of the main filter. In this way, the gaseous fluid pre-purified by the multi-cyclone separator can be supplied for fine purification to the main filter. The multi-cyclone separator acts in this way as a pre-separator in a pre-separation stage.

The main filter can advantageously comprise in particular a prism-shaped main filter element. In addition, the main filter can comprise a further, in particular a secondary fluid filter element. The secondary filter element can serve as a safety element in order to prevent that particles that possibly break through can reach the clean side of the main filter.

Advantageously, the multi-cyclone separator can be attached detachably to a housing of the main filter of the multi-stage fluid filter. In this way, the multi-cyclone separator, in particular for servicing purposes, can be separated in a simple and/or fast way from the housing of the main filter. For this purpose, advantageously quick connect means, in particular fasteners, screw closures, clamp closures, snap-on closures, plug-in closures, or the like can be provided.

Advantageously, the multi-cyclone separator can be designed as a cyclone block which can comprises a housing of the multi-cyclone separator. In the housing of the multi-cyclone separator, the at least one discharge chamber can be arranged.

Advantageously, each cyclone cell can comprise an immersion tube which comprises the inlet for fluid to be purified and the outlet for purified fluid and at which at least one discharge window is realized.

Advantageously, the cyclone block can have at the outlet side a so-called immersion tube plate. The immersion tube plate can delimit the at least one discharge chamber at the outlet side. The immersion tube plate may comprise a plurality of immersion tube openings which are aligned with the respective outlets of the immersion tubes of the cyclone cells. The immersion tube openings and thus the outlets of the immersion tubes can be connected to an inlet side of the downstream main filter.

The at least one immersion tube plate can be advantageously of a one-piece configuration. In this way, manufacture and assembly can be simplified.

Advantageously, at least one discharge window of at least one cyclone cell in the normal installation direction of the multi-cyclone separator can point downwardly in space. In this way, separated particles and liquid can sink simply downward, following the force of gravity. Alternatively, at least one discharge window can be realized as an annular gap which can extend circumferentially at the corresponding immersion tube. Alternatively, at least one discharge window instead of pointing downward in space can also be rotated so that it does not point downward in space.

Advantageously, the funnel-type tapering of the at least one discharge chamber can form a funnel chamber. The funnel chamber is part of the at least one discharge chamber and opens into the at least one discharge opening.

Advantageously, the multi-stage fluid filter, in particular the multi-cyclone separator, can be embodied elongate, in particular parallelepipedal. In this way, the multi-stage fluid filter, depending on the installation space that is available, can be arranged in a corresponding orientation in space. In a preferred orientation, the multi-stage fluid filter can be arranged with its longer side being vertical, i.e., upright, in space. In another preferred orientation, the multi-stage fluid filter can be arranged with its longer side being horizontal in space, i.e., in lying position.

The multi-stage fluid filter can also be arranged in another orientation in space. In the upright arrangement, more cyclone cells can be arranged above each other in space than in the lying arrangement. In the lying arrangement, more discharge openings can be arranged adjacent to each other at a bottom side of the multi-cyclone separator in space compared to an upright arrangement. In the lying arrangement, a plurality of separator segments with respective discharge chambers can be arranged adjacent to each other. Thus, as a whole, for any arrangement in space a respective best separation efficiency can be achieved.

Advantageously, a swirl direction of the cyclone cells can vary. In case of use of a plurality of discharge chambers, the swirl directions of the cyclone cells in the various discharge chambers can vary. The swirl directions can also vary within one discharge chamber.

Advantageously, the multi-stage fluid filter can be a multi-stage air filter. The air filter can be advantageously part of an air intake manifold of an internal combustion engine. It can serve for purifying combustion air which is supplied to the internal combustion engine. Alternatively, the air filter can also be a cabin filter.

The invention can be employed in motor vehicles, in particular passenger cars, trucks, buses, agricultural and/or construction vehicles, construction/agricultural machines, compressors, industrial motors or other devices, in particular with internal combustion engines. The invention can be used in land craft, watercraft and/or aircraft.

In a further advantageous embodiment, in the at least one discharge chamber at least one discharge surface can be arranged which at least partially forms the funnel-type tapering of the at least one discharge chamber, extends to the at least one discharge opening, and, relative to an imaginary discharge axis through the at least one discharge opening, extends at a slant. With the at least one discharge surface, the funnel-type tapering can be realized in a simple way. At the at least one discharge surface, the separated particles and/or the separated liquid can be guided better to the at least one discharge opening.

In a further advantageous embodiment, at least one discharge surface that at least partially forms the funnel-type tapering of the at least one discharge chamber can be positioned at a slant relative to an imaginary discharge axis through the at least one discharge opening at an angle of maximally approximately 40°, in particular maximally approximately 45°. In this way, separated particles and/or liquid can impact at a corresponding acute angle on the at least one discharge surface. In this way it can be prevented better that separated particles and/or liquid remain adhered to the at least one discharge surface. The steeper the at least one discharge surface is arranged, the smaller the quantity of particles and/or liquid that remain adhered thereto or remain lying thereon.

In a further advantageous embodiment, on sides that are oppositely positioned relative to an imaginary discharge axis through the at least one discharge opening, discharge surfaces extending at a slant can be arranged. In this way, the funnel-type tapering relative to the at least one discharge opening can be realized more easily.

Advantageously, an opening angle between the oppositely positioned discharge surfaces can amount to maximally approximately 90°. In this way, the risk can be reduced that separated particles and/or liquids remain lying on the discharge surfaces or remain adhered thereto.

In a further advantageous embodiment, in an operating-ready arrangement of the multi-cyclone separator the at least one discharge opening can be arranged spatially at the bottom. In this way, separated particles and/or liquid, following the force of gravity, can reach in downward direction, with the assistance of the funnel-type tapering, the at least one discharge opening and can exit through it from the discharge chamber.

Advantageously, at least one discharge chamber can comprise at least two discharge openings. In this way, a greater quantity of separated particles and/or separated liquid per unit of time can be discharged from the at least one discharge chamber.

Advantageously, the at least one discharge chamber can have an approximately funnel-type tapering region in front of each discharge opening. In this way, a more efficient discharge of separated particles and/or of the separated liquid can be realized.

In a further advantageous embodiment, the multi-cyclone separator can comprise at least two discharge chambers, each provided with at least one discharge opening. Accordingly, a ratio of a pressure loss to a separation efficiency can be improved.

In a further advantageous embodiment, at least one separation wall can be arranged between at least two separation chambers. In this way, a mutual influence, in particular by separated particles and/or liquid, between the discharge chambers can be reduced. By means of the separation wall, the discharge chambers can be divided into segments. The discharge chambers with the corresponding cyclone cells and corresponding discharge openings can be realized as discharge segments, respectively. As a whole, a service life can be extended by means of a plurality of discharge segments, compared to only one discharge segment.

In a further advantageous embodiment, at least two discharge chambers, viewed in the direction of a flow axis of the gaseous fluid to be purified through the multi-cyclone separator, can be positioned adjacent or atop each other. In this way, the discharge chambers can be flowed through in parallel by the gaseous fluid. As a whole, a total flow of fluid through the multi-cyclone separator can be increased.

In a further advantageous embodiment, the at least one discharge opening is connected or can be connected outside of the at least one discharge chamber with a discharge valve and/or a discharge connector. With a discharge valve, separated particles and/or fluid can be released freely without environmental air being able to reach the discharge chamber.

Advantageously, at least one discharge valve can be embodied as a so-called duckbill valve. Duckbill valves form simple check valves.

Advantageously, the discharge valve can be oriented spatially in downward direction. In this way, separated particles and/or liquid, following the force of gravity, can exit in downward direction through the discharge valve from the discharge chamber.

A corresponding conduit, in particular suction conduit, is connected or can be connected to a discharge connector. Through the conduit, the separated particles and/or liquid can be discharged, in particular sucked away. In order to realize the suction action, a corresponding vacuum can be applied via the discharge connector. In this way, a preseparation efficiency of the multi-cyclone separator can be improved.

Moreover, the object is solved according to the invention for the multi-stage fluid filter in that the at least one discharge chamber of the multi-cyclone separator tapers like a funnel toward the at least one discharge opening.

In other respects, the features and advantages disclosed in connection with the multi-cyclone separator according to the invention and the multi-stage fluid filter according to the invention and their respective advantageous embodiments apply correspondingly among each, and vice versa. The individual features and advantages can, of course, be combined among each other wherein further advantageous effects may result which surpass the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in the drawing, the description, and the claims in combination expediently also individually and combine them to expedient further combinations.

In the Figures, same components are provided with same reference characters.

DESCRIPTION OF PREFERRED EMBODIMENTS

In FIGS. 1 to 4, a two-stage air filter 10 according to a first embodiment is shown in different perspective views and sections. The air filter 10 can be used, for example, in an air intake manifold of a construction or agricultural machine for purifying air.

The air filter 10 comprises a main filter 12 having arranged upstream thereof a multi-cyclone separator 14. The air filter 10 as a whole is configured as a so-called inline filter. Correspondingly, the multi-cyclone separator 14 is configured as a so-called inline separator. A flow axis 16 of the air to be purified through the air filter 10 extends through the multi-cyclone separator 14 and the main filter 12. By means of the multi-cyclone separator 14, the air to be purified is coarsely freed of particles and liquid, for example, water or water droplets, and subsequently supplied to the main filter 12. By means of the main filter 12, the air which has been freed of particles and liquid is filtered.

Figure 1:
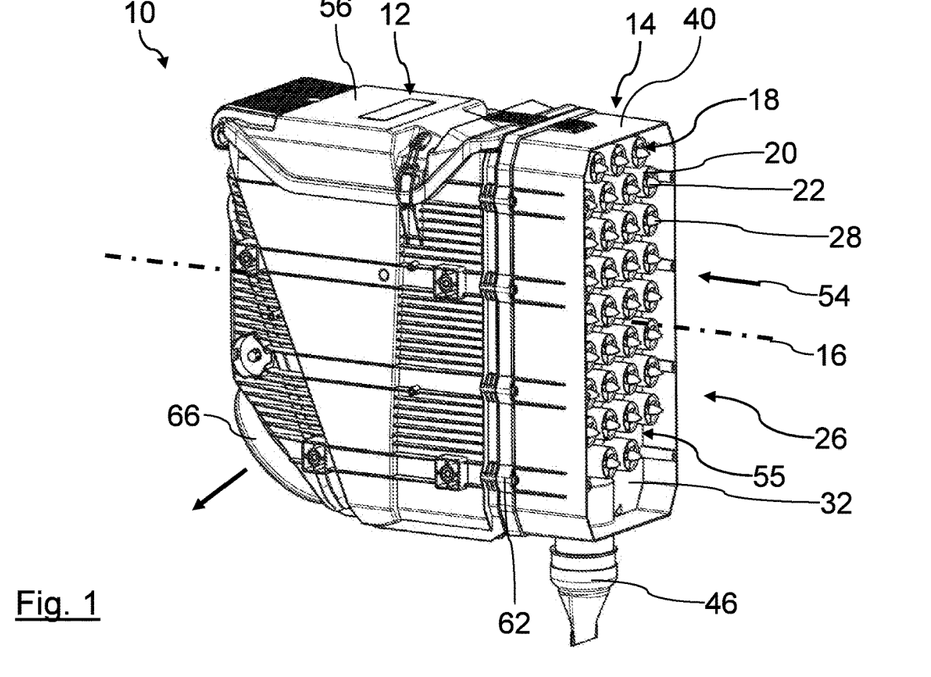
FIG. 1 shows an isometric illustration of a two-stage air filter of an internal combustion engine in upright arrangement, with a multi-cyclone separator according to a first embodiment.
Figure 2:
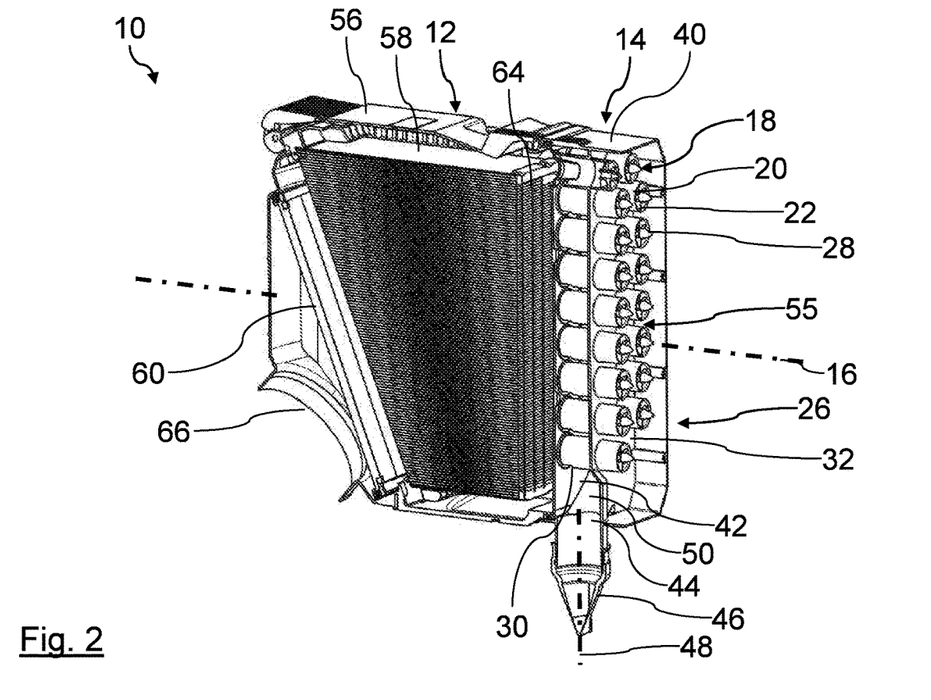
FIG. 2 shows a longitudinal section of the air filter of FIG. 1.

The multi-cyclone separator 14 is configured as a cyclone block. The multi-cyclone separator 14 as a whole is approximately parallelepipedal. In the normal installation state, the air filter 10 and thus also the multi-cyclone separator 14, as illustrated, for example, in FIG. 1, is arranged upright, with its longitudinal direction vertical in space.

In the multi-cyclone separator 14, a plurality of generally known cyclone cells 18 are parallel connected in regard to flow. Each cyclone cell 18 comprises a circular cylindrical immersion tube 20 with an inlet 22 for air to be purified and an outlet 24 for air that has been freed of particles and liquid.

The inlet 22 and the outlet 24 are located relative to the respective immersion tube axis on axially oppositely positioned sides. The inlets 22 are arranged at the inlet side 26 of the multi-cyclone separator 14. The immersion tube axes of the immersion tubes 20 extend parallel and parallel to the flow axis 16.

Moreover, each cyclone cell 12 comprises a guide vane 28 which is arranged within the immersion tube 20. The swirl directions of the guide vanes 28 can be identical or different.

At the end face which is facing the outlet 24, each immersion tube 20 comprises at its circumferential side an outlet window 30 for discharging separated particles and liquid. The outlet window 30 is located, for example, at the circumferential side of the immersion tube 20 that is spatially at the bottom in the normal installation state of the multi-cyclone separator 14. In this way, the separated particles and the liquid can exit in downward direction from the immersion tube 20, following the force of gravity.

Figure 3:
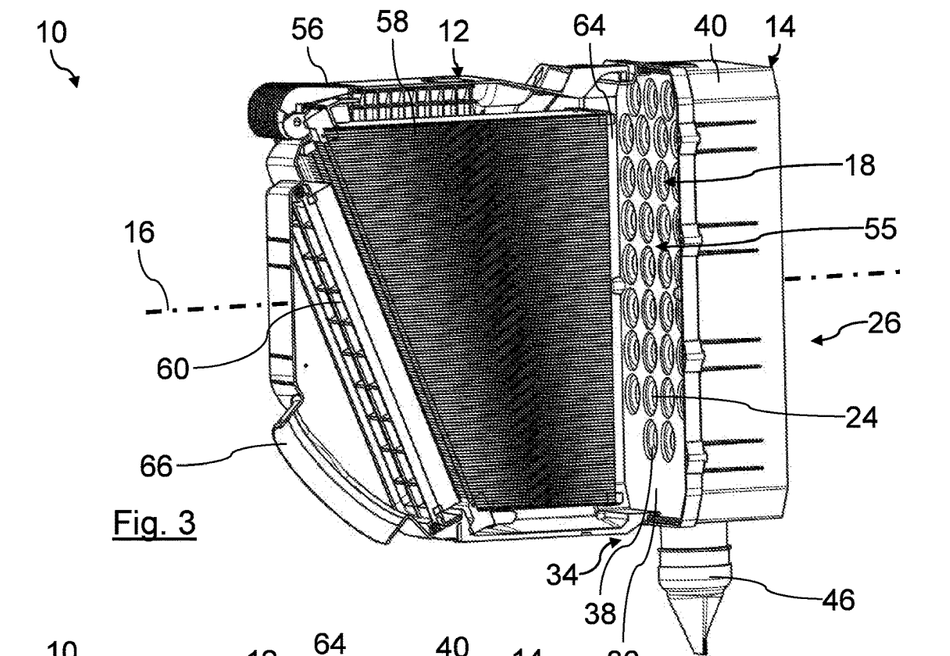
FIG. 3 shows a first partial section of the air filter of FIGS. 1 and 2.
Figure 4:
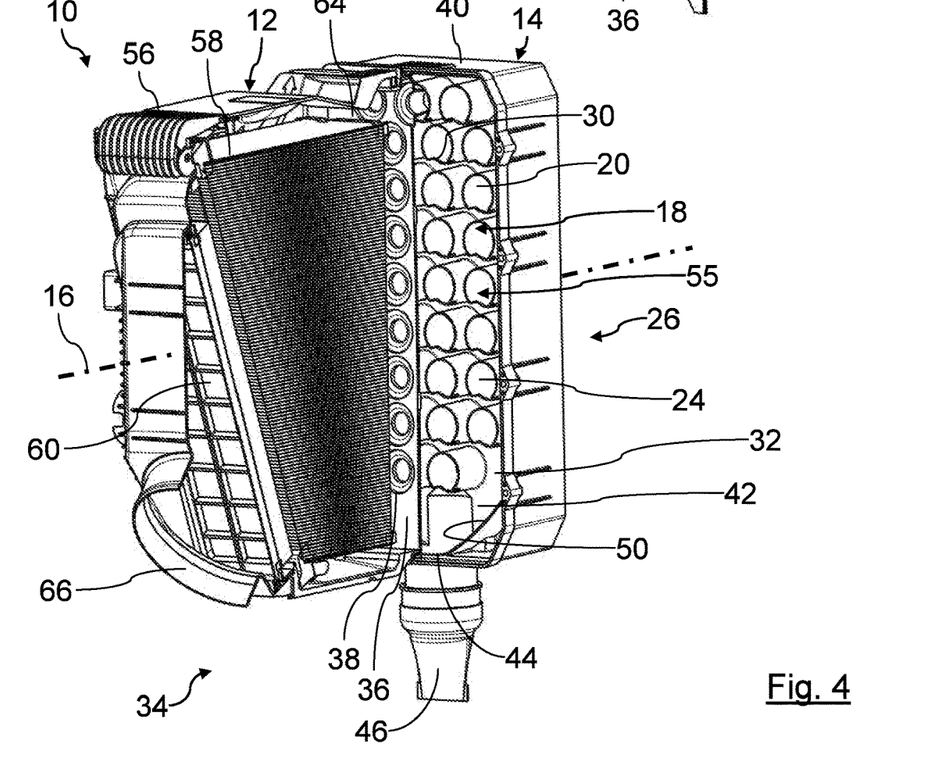
FIG. 4 shows a second partial section of the air filter of FIGS. 1 to 3.

The immersion tubes 20 penetrate a front wall 32 of the multi-cyclone separator 14 which is facing the inlet side 26. At the outlet side 34 of the multi-cyclone separator 14 facing away from the inlet side 26, an immersion tube plate 36, which is shown, for example, in FIG. 3, is arranged detachably. The immersion tube plate 36 extends across the entire extension of the outlet side 34. It has a plurality of immersion tube openings 38 which are aligned with the immersion tubes 20, respectively, the corresponding outlets 24.

The immersion tube plate 36, the front wall 32, and a circumferential wall 40 of the multi-cyclone separator 14 delimit a discharge chamber 42 for separated particles and liquid. The outlet windows 30 of the cyclone cells 18 are open toward the discharge chamber 42. The immersion tube plate 36, the front wall 32, and the circumferential wall 40 form essentially a housing of the multi-cyclone separator 14.

At the bottom transverse side of the circumferential wall 40, a discharge opening 44 leads out of the discharge chamber 42. At the exterior side, a discharge valve 46 in the form of a duckbill valve is connected to the discharge opening 44. The discharge chamber 42 with the cyclone cells 18 and the discharge opening 44 with the discharge valve 46 form a separator segment 55 of the multi-cyclone separator 14.

At the side which is facing the discharge opening 44, two discharge surfaces 50 are provided in the discharge chamber 42. The discharge surfaces 50 are arranged in an exemplary fashion like a funnel symmetrically on opposite sides relative to a discharge axis 48 through the discharge opening 44, respectively, relative to an imaginary plane containing the discharge axis 48 and the flow axis 16. The discharge chamber 42 tapers toward the discharge opening 44 like a funnel. The region of the discharge chamber 42 with the funnel-type tapering (funnel shape) can be referred to as funnel chamber.

Figures 5, 6:
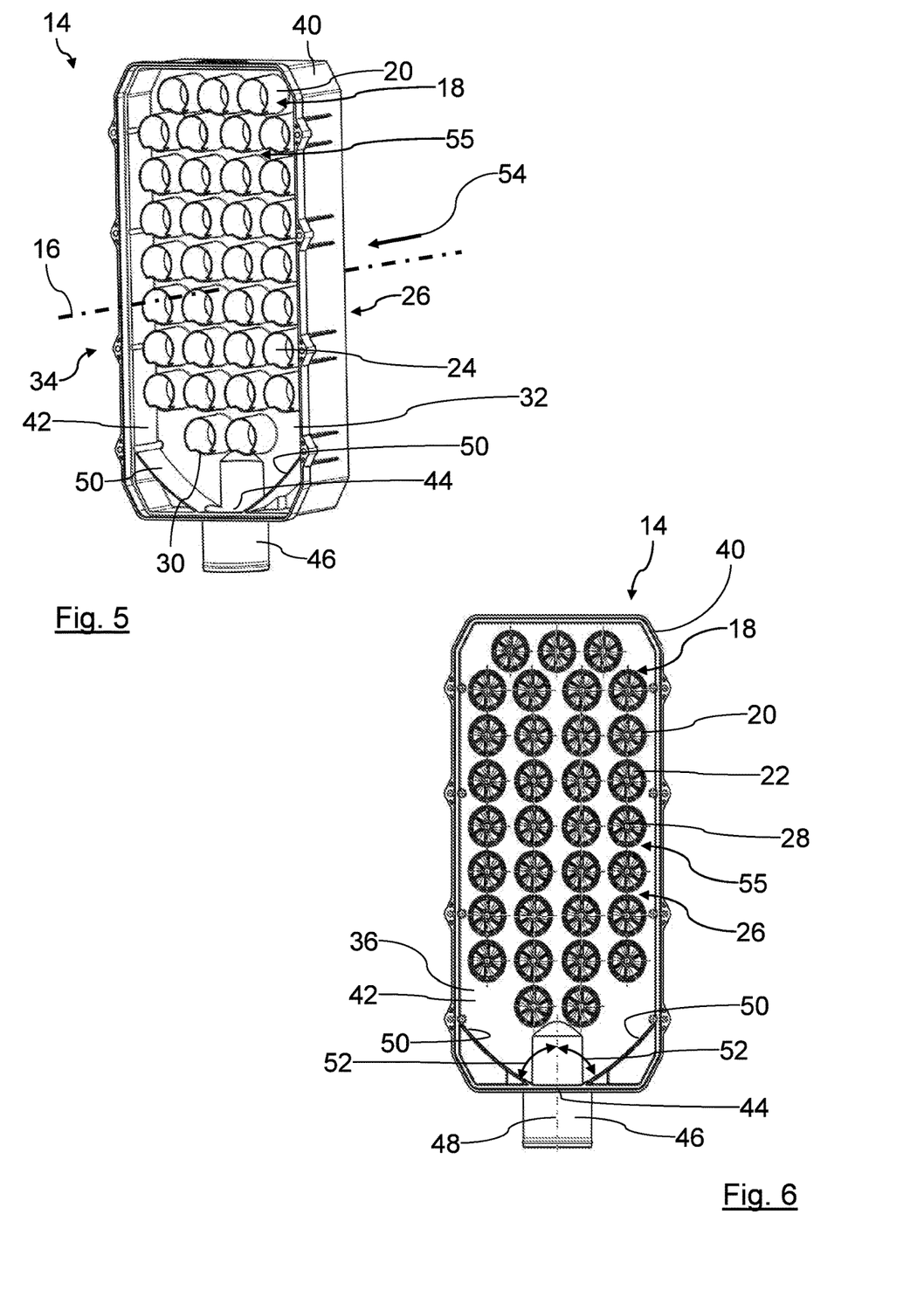
FIG. 5 shows the multi-cyclone separator of FIGS. 1 to 4 without immersion tube plate in a view of the outlet side.
FIG. 6 shows the multi-cyclone separator of FIGS. 1 to 5 without front wall in a view of the inlet side.

The discharge surfaces 50 each are slanted relative to the discharge axis 48 about an angle 52 illustrated in FIG. 6. The angles 52 are preferably each smaller than 45°. The illustration in FIG. 6 is not true to the angle. As a whole, the two discharge surfaces 50 are slanted relative to each other by an opening angle that is smaller than 90°.

Viewed in flow direction 54 of the air to be purified through the multi-cyclone separator 14, a main filter inlet side 64 of the main filter 12 adjoins downstream the outlet side 34. The main filter 12 comprises an approximately parallelepipedal openable filter housing 56 in which a prism-shaped main filter element 58 and a flat secondary filter element 60 are each arranged to be exchangeable.

The multi-cyclone separator 14 is fastened by means of quick connect devices 62 in the form of screws in a detachable way to the filter housing 56. The side of the filter housing 56 which is facing the multi-cyclone separator 14 is open areally and forms the main filter inlet side 64.

At the side which is axially facing away from the main filter inlet side 64 relative to the flow axis 16, the filter housing 56 comprises an outlet socket 66 for purified air located obliquely at the bottom.

In operation of the air filter 10, air to be purified is sucked in through the inlets 22 into the immersion tubes 20 of the cyclone cell 18 and by means of the respective guide vanes 28 is imparted with a swirl. In this way, as is generally known, coarse particles and liquid contained in the air that is sucked in are separated at the inner sides of the immersion tubes 20 and reach through the respective outlet windows 30, following the force of gravity, the discharge chamber 42.

The separated particles and the separated liquid sink, following the force of gravity, in the discharge chamber 42 downwardly and are guided by the funnel-type arrangement of the discharge surfaces 50 to the discharge opening 44. The separated particles and the separated liquid exit from the discharge chamber 42 through the discharge valve 46. The multi-cyclone separator 14 can be referred to as a Aself-discharging multi-cyclone separator@ because no additional suction action at the discharge opening 44 is required for discharging the particles and the liquid.

The air that has been freed of coarse particles and liquid exits from the immersion tubes 20 through the respective outlets 24 and flows toward the main filter inlet side 64 of the main filter 12. The pre-purified air flows through a filter medium of the main filter element 58 and is filtered.

The filtered air exits from the main filter element 58 and flows through the secondary filter element 60 where the air is further freed of still contained particles. The filtered air exits from the main filter 12 through the outlet socket 66.

Figure 7:
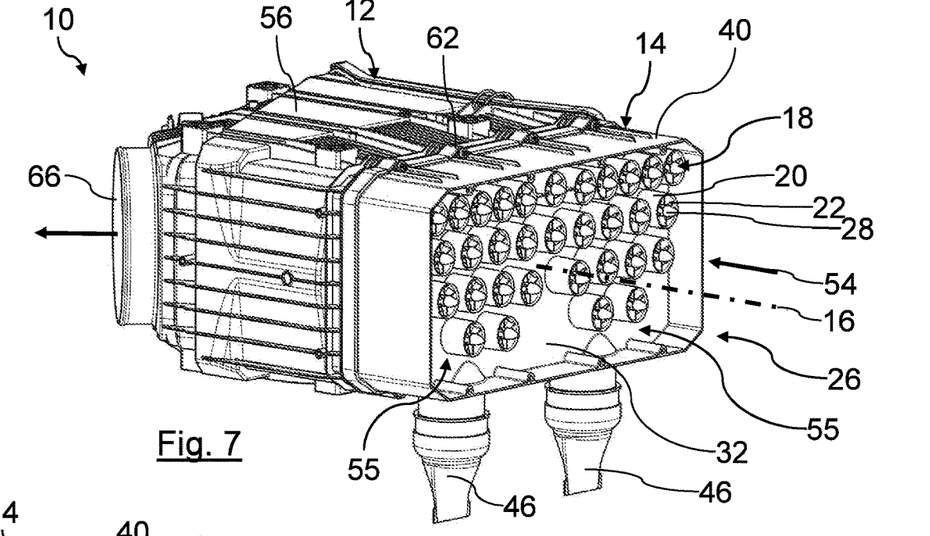
FIG. 7 shows an isometric illustration of a two-stage air filter in lying arrangement, with a multi-cyclone separator according to a second embodiment.
Figure 8:
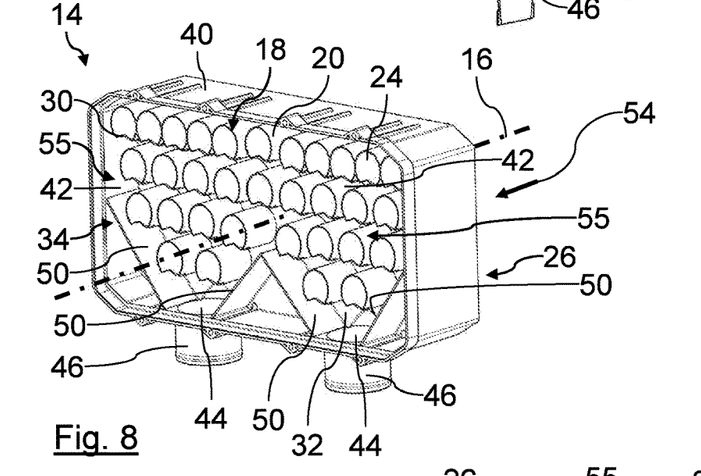
FIG. 8 shows the multi-cyclone separator of FIG. 7 without immersion tube plate in a view of the outlet side.
Figure 9:
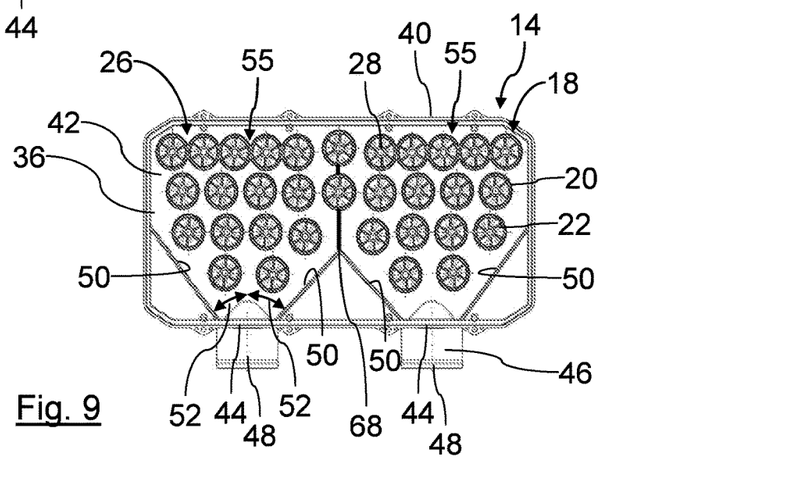
FIG. 9 shows the multi-cyclone separator of FIGS. 7 and 8 without front wall in a view of the inlet side.

In FIGS. 7 to 9, the two-stage air filter 10 with a multi-cyclone separator 14 is illustrated according to a second embodiment. Those elements that are similar to those of the first embodiment of FIGS. 1 through 6 are provided with the same reference characters. The air filter 10 of the first embodiment and of the second embodiment comprise the same main filter 12 and different multi-cyclone separators 14 wherein the connecting sides of the multi-cyclone separators 14 of the two embodiments relative to the filter housing 56 are identical.

In contrast to the first embodiment, the entire air filter 10 in the second embodiment is arranged lying in contrast to being upright in the first embodiment. This means that the longitudinal sides of the parallelepipedal multi-cyclone separator 14 and of the filter housing 56 extend horizontally.

The multi-cyclone separator 14 according to the second embodiment comprises two separator segments 55. The two separator segments 55 are arranged adjacent to each other, viewed in the direction of the flow axis 16. Each separator segment 55 comprises a plurality of cyclone cells 18 and a discharge chamber 42 which tapers toward a respective discharge opening 44 like a funnel. The two discharge chambers 42 are separated from each other by a separation wall 68 which is shown in FIG. 9, for example. In FIG. 8, the separation wall 68 is not illustrated for better clarity. The discharge valves 46 of the separator segments 55 are located spatially at the bottom at the longitudinal side of the multi-cyclone separator 14.

Depending on whether the air filter 10 is to be arranged upright as in the first embodiment or lying as in the second embodiment, the corresponding multi-cyclone separator 14 according to the first embodiment or according to the second embodiment can be combined with a same main filter 12.

What is claimed is:

1. A multi-cyclone separator of a multi-stage fluid filter for purifying a gaseous fluid, the multi-cyclone separator comprising:
   a circumferential outer wall;
   a plurality of cyclone cells for separating particles and/or liquid from the gaseous fluid, plurality of cyclone cells extending axially is direction of a flow axis and arranged at an interior side of the circumferential outer wall, the cyclone cells each comprising:
      an inlet for the gaseous fluid to be purified,
      an outlet for the gaseous fluid freed of particles and liquid, and
      at least one discharge window configured to discharge the separated particles and liquid from the cyclone cell;
   at least one discharge chamber arranged at the interior side of the circumferential outer wall,
      wherein the discharge windows of the cyclone cells open into the at least one discharge chamber;
   at least one discharge opening extending through the circumferential outer wall and leads out of the at least one discharge chamber;
   wherein the at least one discharge chamber tapers in a funnel shape toward the at least one discharge opening,
   wherein the funnel shape is at least partially formed by at least one discharge surface arranged at an interior side of the circumferential outer wall and in the at least one discharge chamber, the at least one discharge surface extending axially and at least partially forms the funnel shape of the at least one discharge chamber tapering toward the at least one discharge opening, wherein the at least one discharge surface had a lower end which terminates at or on the at least one discharge opening.

2. The multi-cyclone separator according to claim 1, wherein the at least one discharge surface is slanted at an angle of maximally approximately 40 degrees relative to the imaginary discharge axis extending through the at least one discharge opening.

3. The multi-cyclone separator according to claim 1, wherein the at least one discharge surface is slanted at an angle of maximally approximately 45 relative to the imaginary discharge axis extending through the at least one discharge opening.

4. The multi-cyclone separator according to claim 1, wherein two of the at least one discharge surface are arranged opposite each other relative to the imaginary discharge axis extending through the at least one discharge opening.

5. The multi-cyclone separator according to claim 1, wherein, in an operation-ready arrangement of the multi-cyclone separator, the at least one discharge opening is arranged spatially at a bottom of the multi-cyclone separator.

6. The multi-cyclone separator according to claim 1, wherein the multi-cyclone separator comprises two or more of the at least one discharge chamber, wherein said two or more discharge chambers each comprise one or more of the at least one discharge opening.

7. The multi-cyclone separator according to claim 6, further comprising at least one separation wall arranged between said two or more discharge chambers.

8. The multi-cyclone separator according to claim 6, wherein said two or more discharge chambers, viewed in a direction of the flow axis of the gaseous fluid to be purified through the multi-cyclone separator, are arranged adjacent to each other.

9. The multi-cyclone separator according to claim 6, wherein said two or more discharge chambers, viewed in a direction of the flow axis of the gaseous fluid to be purified through the multi-cyclone separator, are arranged atop each other.

10. The multi-cyclone separator according to claim 1, wherein the at least one discharge opening, outside of the at least one discharge chamber, is connected to a discharge valve.

11. The multi-cyclone separator according to claim 1, wherein the at least one discharge opening, outside of the at least one discharge chamber, is connected to a discharge connector.

12. The multi-cyclone separator according to claim 1, wherein the at least one discharge opening, outside of the at least one discharge chamber, is connected to a discharge valve and a discharge connector.

13. A multi-stage fluid filter for purifying a gaseous fluid, the multi-stage fluid filter comprising:

a main filter configured to purify the gaseous fluid;

at least one multi-cyclone separator arranged upstream of the main filter, wherein the multi-cyclone separator comprises:

a plurality of cyclone cells for separating particles and/or liquid from the gaseous fluid, the plurality of cyclone cells extending axially is direction of a flow axis and arranged at an interior side of the circumferential outer wall, the cyclone cells each comprising:

an inlet for the gaseous fluid to be purified, an outlet for the gaseous fluid freed of particles and liquid, and at least one discharge window configured to discharge the separated particles and liquid from the cyclone cell;

at least one discharge chamber arranged at the interior side of the circumferential outer wall, wherein the discharge windows of the cyclone cells open into the at least one discharge chamber;

at least one discharge opening that leads out of the at least one discharge chamber;

wherein the at least one discharge chamber tapers in a funnel shape toward the at least one discharge opening, wherein the funnel shape is at least partially formed by at least one discharge surface arranged at an interior side of the circumferential outer wall and in the at least one discharge chamber, the at least one discharge surface extending axially and at least partially forms the funnel shape of the at least one discharge chamber tapering toward the at least one discharge opening, wherein the at least one discharge surface had a lower end which terminates at or on the at least one discharge opening.

* * * * *